United States Patent [19]

Vestberg et al.

[11] Patent Number: 5,312,872

[45] Date of Patent: May 17, 1994

[54] METHOD FOR PREPARING A VINYL POLYMER-POLYOLEFINE COMPOSITE

[75] Inventors: Torvald Vestberg, Porvoo; Ismo Lehtiniemi, Helsinki, both of Finland

[73] Assignee: Neste Oy, Finland

[21] Appl. No.: 103,886

[22] Filed: Aug. 6, 1993

Related U.S. Application Data

[63] Continuation of Ser. No. 761,340, Sep. 17, 1991, abandoned.

[30] Foreign Application Priority Data

Sep. 18, 1990 [FI] Finland ................................. 904586

[51] Int. Cl.$^5$ ..................... C08F 255/02; B32B 27/30; C08J 3/02
[52] U.S. Cl. ....................................... 525/324; 525/83; 525/260; 525/263; 525/285; 525/302; 525/309; 525/316; 524/501; 524/504; 523/200
[58] Field of Search ................. 525/83, 260, 263, 285, 525/302, 309, 316, 324; 524/501; 523/202, 205, 200

[56] References Cited

U.S. PATENT DOCUMENTS

| | | | |
|---|---|---|---|
| 3,968,185 | 7/1976 | Baldwin et al. | 525/316 |
| 4,202,845 | 5/1980 | Chang et al. | 525/302 |
| 4,303,756 | 12/1981 | Kajimura et al. | 525/302 |
| 4,412,938 | 11/1983 | Kakizaki et al. | 524/504 |
| 4,920,175 | 4/1990 | Kanda et al. | 523/202 |

*Primary Examiner*—Paul R. Michl
*Assistant Examiner*—Tae H. Yoon
*Attorney, Agent, or Firm*—Steinberg, Raskin & Davidson

[57] ABSTRACT

A method for preparing a polyolefine-vinyl composite, in which method about 10–200 weight fractions of vinyl monomer and about 0.01–4.0 weight fractions of a free radical polymerization initiator, based on 100 weight fractions of vinyl monomer, are impregnated in 100 weight fractions of polyolefine particles by slowly mixing these at a temperature of about 20°–100° C. while continuously or discontinuously adding about 1–60% by weight of water, based on the total weight of the vinyl monomer and the polyolefine, during the maintenance of the particle structure of the polyolefine, is disclosed. A water suspension is prepared by adding water and stabilizing agents to the above-mentioned mixture after a completed impregnation. The total quantity of water is about 80–1000 weight fractions, based on 100 weight fractions of polyolefine+vinyl monomer. The temperature of the water suspension is then increased for polymerizing the vinyl monomer.

13 Claims, No Drawings

METHOD FOR PREPARING A VINYL POLYMER-POLYOLEFINE COMPOSITE

This is a continuation of application Ser. No. 07/761,340, filed Sep. 17, 1991 now abandoned.

FIELD OF THE INVENTION

The invention relates to a method for preparing a vinyl polymer-polyolefine composite.

BACKGROUND OF THE INVENTION

In order to improve the rigidity, dimensional stability, printability, etc. of polyolefines which are to be worked into various articles or which are to be foamed into foam plastic, attempts have been made to blend the polyolefine with some vinyl polymer, e.t. polystyrene. Due to the low compatibility of polystyrene in polyolefines, it has proved to be difficult to obtain homogeneous blends with an attractive appearance. For example, with regard to small amounts, 02–10% by weight, the blend gets a low impact resistance and an impaired appearance.

Attempts have been made to overcome the above problem by polymerizing styrene inside the polyolefine particles. Basically, two different methods of polymerizing styrene in situ polyolefine particles have been suggested. Both methods are based on the fact that styrene is allowed to diffuse into the polyolefine particles, after which the polymerization of styrene occurs in a basically traditional way. The greatest difference between the two methods is the way in which styrene is allowed to diffuse into the polyolefine particles.

In West German patent DE 29 08 662, the polymerization of styrene in situ is described in several different polyolefines. In this method, styrene is added slowly into a water suspension containing polyolefine particles at an elevated temperature. Thus, the impregnation and polymerization of the styrene occur simultaneously, with the result that the polymerization tends to occur more in the surface regions of the polyolefine particles. This results in the polystyrene being concentrated on the surface layer of the polyolefine particles.

U.S. Pa. No. 4,412,938 describes the polymerization of styrene in situ in an ethylene vinyl acetate copolymer. In this method, all of the styrene is added at one time into a water suspension containing ethylene vinyl acetate copolymer particles. The styrene is added at so low a temperature that no polymerization occurs. Only after all styrene or most of the styrene has diffused into the ethylene vinyl acetate copolymer particles is the temperature increased and the polymerization started. A disadvantage of this method is that it lasts several hours before the styrene has diffused into the ethylene vinyl acetate copolymer particles. The method is, therefore, time-consuming.

Neste Oy's Finnish Patent Application No. 894461 (Corresponding to U.S. Pat. No. 5,164,456) describes a method for preparing a polyolefine-vinyl polymer composite in which method the impregnation occurs totally in the absence of water.

OBJECTS AND SUMMARY OF THE INVENTION

It is an object of the present invention to provide a method for the preparation of a polyolefine-vinyl polymer composite which avoids the problems and disadvantages related to the above-mentioned preparation methods while maintaining the desirable characteristics of the above-mentioned methods, i.e., that a homogeneous blend of the polyolefine and the vinyl polymer is obtained and that the polymerization product is obtained in a particulate form.

Accordingly, the present invention relates to a novel way of preparing a polyolefine composite which can be applied to by used as such and worked into various articles, e.g. as foam plastic or as a component in semi-conducting layers on electric cables. The composite is comprised of a polyolefine and a vinyl polymer, and the invention relates to the preparation of this composite by polymerizing the vinyl monomer inside the polyolefine particles.

In the inventive method, about 10-200 weight fractions of vinyl monomer and about 0.01-4.0 weight fractions of a free radical polymerization initiator, based on 100 weight fractions of vinyl monomer, are impregnated in about 100 weight fractions of polyolefine particles by slowly blending the vinyl monomer and free radical polymerization initiator at a temperature of from about 20° to about 100° C. while continuously or discontinuously adding from about 1 to about 60% by weight of water, based on the total weight of the vinyl monomer and the polyolefine, during the maintenance of the particle structure of the polyolefine. Water is then added to the above-mentioned blend after a substantially completed impregnation suspension to prepare a water suspension, such that the total quantity of water becomes about 80–1000 water fractions, based on 100 weight fractions of polyolefine and vinyl monomer, as well as a stabilizing agent. Thereafter, the temperature of the water suspension is increased for polymerizing the vinyl monomer.

In a preferred embodiment, the vinyl monomer comprises an aromatic vinyl monomer such as styrene or substituted styrene. In other preferred embodiments, up to about 50% of the vinyl monomer is replaced by some other monomer, such as acrylonitrile, metacrylonitrile, $C_1$–$C_7$ alkyl metacrylate, vinyl halides, maleic acid anhydride, acrylic-C amide and metacrylic amide.

In other preferred embodiments of the present invention, the initiator is an organic free radical polymerization initiator, such as a peroxide or an azo compound, e.g. benzoyl peroxide, lauroyl peroxide, t-butyl peroxybenzoate, dicumyl peroxide and axobis-isobutyronitrile.

DETAILED DESCRIPTION

After the 100 weight fractions of polyolefine particles have been mixed with 10-200 weight fractions of vinyl monomer and 0.01-4 weight fractions of a free radical initiator, based on 100 weight fractions of monomer, the blend is slowly agitated. The temperature during this step is low enough that no decomposition of the initiator and no polymerization occur, but high enough that the polyolefine articles are impregnated with the monomer. During this impregnation phase, a small portion of the water is added at substantially the same rate as the vinyl monomer impregnates the polyolefine. Alternatively, a small portion of the water can be added as a batch at the start of the impregnation. When all or most of the monomer and initiator has diffused into the polyolefine particles, the remaining portion of the water and a stabilizing agent are added to make a suspension. Thereafter, the temperature is increased and the polymerization starts. After the polymerization step is completed, the polymerization product is washed and dried.

In this method for preparing a polyolefine-vinyl polymer composite, the absorption of the styrene first occurs in the absence of water and thereafter in the presence of only a small amount of water. This means that the monomer, to be able to penetrate into the polyolefine particles, has to be transported through only a small amount of water, which means that the impregnation is more rapid than in the method described in the U.S. Pat. No. 4,412,938.

During the impregnation in the present invention, the polyolefine particles partly swell depending on how much vinyl monomer has been added, but the particulate form of the polyolefine is still maintained.

In comparison with Neste Oy's Finnish Application No. 894461, the present method has two advantages. First, the power demand of the agitator motor is lower, since the water present during the impregnation has a "lubricating" effect o the mixing of the polyolefine particles. Second, there is no risk that the particles break down, since the space between the particles is at the start filled with the monomer, later with the monomer and water, and finally, at least partly with water.

Useful polyolefines in the present invention include high density polyethylene, low density polyethylene, and linear low density polyethylene. The polyethylene can be a homopolymer or a copolymer. The comonomer can be e.g. vinyl acetate, metacrylate, methyl metacrylate, ethyl acrylate and metacrylate, butylacrylate and butylmetacrylate, vinyl chloride, propene, or some other $\alpha$-olefin. Ethylene-$\alpha$-olefine-polyene-terpolymers can also be used. Useful $\alpha$-olefines include propene, butene, pentene, isofrene, hexene, or their mixtures, and useful polyenes include hexadiene-1,4, hexadiene-1,5, heptadiene-1,6,2-methyl pentadiene-1-4, octadiene-1,7, 6-methyl heptadiene-1,5, octatriene, and dicyclo pentadiene. In case the ethylene polymer is a copolymer, the share of the ethylene in the copolymer must be at least 50% by weight.

The polyolefine can also be comprised of polypropene and its copolymer. The propene polymers can consist of more than 50% by weight of propene and the comonomer can be ethylene or some $\alpha$-olefine or some polar unsaturated monomer.

Poly(ethylene-co-vinyl acetate) has proved to be especially suitable as a polyolefine in the preparation of polyolefine vinyl polymer composites. In this case, the share of the vinyl acetate in the copolymer must be from about 1 to about 35% weight.

The polyolefine is preferably in a particulate form with a particle size from about 0.5 to about 10 mm, most preferably from about 1 to about 6 mm. When the polyolefine is in a particulate form, it is easy to achieve a good agitation during the impregnation phase, which is a precondition for the fact that the concentration of the vinyl monomer becomes the same in all polyolefine particles. If the particles are too large, it may be difficult to keep the suspension stable during the final step of the polymerization. Stability problems can also occur in connection with small particles.

Useful monomers are e.g. aromatic vinyl monomers of the type styrene and substituted styrenes. Substituted styrenes can have the substituent on the benzene rings, such as in methyl styrene, isopropyl styrene, or on the o-carbon, such as in $\alpha$-methyl styrene and $\alpha$-styrene. The above-mentioned aromatic vinyl monomers can be used together with other vinyl monomers, e.g. acrylonitrile, $C_1$-$C_7$ alkyl acrylates, $C_1$-$C_7$ alkyl metacrylates, vinyl halides, metacrylonitrile, maleic anhydride, acryl amide, and metacryl amide. The amount of this other vinyl monomer is up to a maximum of about 50% by weight of the total amount of vinyl monomer. Styrene has proved to be especially suitable for the preparation of polyolefine-vinyl polymer composites.

The quantity of the vinyl monomer to be polymerized in the polyolefine matrix is from about 20 to about 100 weight fractions, based on 100 weight fractions of polyolefine. A larger quantity of vinyl monomer than about 200 weight fractions causes problems such that it is difficult to keep the polyolefine in a particle form during the impregnation; the particles tend to agglomerate and form a homogeneous phase. It is not appropriate to add a smaller quantity of vinyl monomer than about 10 weight fractions, since such quantities of vinyl monomer provide only small changes in the properties of the initial polyolefine.

Initiators, which are used for polymering the vinyl monomer, are initiators which are conventionally used in the suspension polymerization. Useful initiators include organic peroxides, such as benzoyl peroxide, lauroyl peroxide, t-butyl perbenzoate, t-butyl-peroxy-2-ethyl hexanate, t-butyl peroxide, dikymyl peroxide, di-t-butyl peroxide, bis(t-butyl peroxyisopropyl)benzene, t-butyl peroxy-isopropyl carbonate, as well as azo compounds, such as azobis-isobutyronitrile and azobis-dimethyl valeronitrile.

More than one initiator is preferably used simultaneously so that the polymerization starts at a low temperature with a low-temperature initiator and is completed at a high temperature with a high-temperature initiator. The total amounts of the initiator may be about 0.01–4 weight fractions, most preferably about 0.1–1.2 weight fractions, based on 100 weight fractions of vinyl monomer.

Accordingly, during the impregnation of the vinyl monomer in the polyolefine particles, part of the water is added continuously or discontinuously in small batches. The purpose of the addition of this portion of the water during the impregnation of vinyl monomer in the polyolefine particles is to fill the empty space forming between the particles, when the vinyl monomer is absorbed in the polyolefine particles. This portion of the water thus decreases the friction between the particles and thereby prevents the particles from breaking down. Due to the decreased friction, the power demand of the agitator motor is substantially decreased.

In another embodiment of the present invention, the amount of water to be added during the impregnation step is lower than that which is needed for filling the empty space between the polyolefine particles. This water can be added all at one time at the start of the impregnation, or continuously during the impregnation process. Also in this case, the water decreases the friction between the particles and thereby decreases the risk that the particles break down, and the power demand of the agitator motor is decreased. The impregnation is done in such a way that polyolefine particles, styrene and initiators are batched into a reactor in any order.

If the initiator or the initiators are in a powder form, they are preferably dissolved in part of or in the total amount of vinyl monomer for ensuring that the concentration of the initiator becomes the same in the different polyolefine particles.

The impregnation is thus started in the absence of water, but the addition of water is started immediately when the polyolefine particles begin to absorb the vinyl monomer. The maximum amount of water to be added during the impregnation, i.e. the amount of water which is needed to totally fill the empty space between the particles at the end of the impregnation when all vinyl monomer is absorbed by polyolefine particles, is of the order of about 60% by weight of the total amount of the polyolefine and vinyl monomer. The maximum amount of water added during the impregnation step is from about 6 to about 75%, and more preferably from about 15 to about 60% of the total amount of water present in the suspension phase. The minimum amount of water to be added during the impregnation is the amount of water which is needed to decrease the friction between the particles, and this amount of water is greater than about 1.0% by weight of the total amount of polyolefine and vinyl monomer.

The temperature during the impregnation step is from about 20° to about 100° C., depending on the type of polyolefine and vinyl monomer, i.e. depending on how easily the vinyl monomer penetrates into the polyolefine. The impregnation temperature is preferably low enough such that practically no polymerization occurs during the impregnation phase. The impregnation temperature must thus be observed when selecting the initiator.

For keeping the concentration of the vinyl monomer the same in the different polyolefine particles, the contents of the reactor must be slowly mixed during the impregnation. The agitation rate expressed as the top speed of the agitator is not critical, but it is preferably in the range from about 0.1 to about 1.0 m/s. If the agitation rate is too low, the vinyl monomer can be unevenly distributed between the polyolefine particles.

The impregnation can be ceased when all or practically all vinyl monomer has diffused into the polyolefine particles. This is in practice controlled simply by taking a sample of the liquid in the reactor. The sample soon separates into a water phase and a vinyl monomer base. When the amount of the non-absorbed vinyl monomer, which thus corresponds to the amount of vinyl monomer in the sample, is smaller than 10% by weight of the total amount of the vinyl monomer phase in the sample, the suspension step can be started. The remaining free vinyl monomer is absorbed by the polyolefine particles at the start of the suspension step.

The impregnation generally lasts for about 0.2-3.0 hours depending on how easily the vinyl monomer penetrates into the polyolefine particles and depending on whether or not the impregnation has been performed at an elevated temperature. It is not necessary to perform the impregnation in the same reactor as the polymerization.

After the impregnation has been completed, the suspension water and the suspending agents are added, and the agitation rate is increased to values normal in connection with suspension polymerization, i.e. to such values that it is possible to maintain a good agitation in the reactor and keep the suspension stable.

Suspending agents useful in the present invention include those substances normally used in suspension polymerization of vinyl monomers. These include e.g. water soluble polymers, such as polyvinyl alcohol, polyvinyl pyrrolidone, and methyl cellulose or partially water soluble substances, such as calcium triphosphate and magnesium pyrophosphate.

The total amount of water, i.e. the amount of water to be added during the impregnation plus the amount of water added for preparing the water suspension, is not critical, but it must be large enough that the suspension is maintained during the polymerization, which equals from about 80 to about 100 weight fractions, more preferably from about 100 to about 500 weight fractions of water based on 100 weight fractions of polyolefine and vinyl monomer.

If the impregnation has been performed at an elevated temperature, the water is preferably heated to the same temperature before it is blended with the polyolefine particles swollen by the vinyl monomer. This prevents the vinyl monomer from diffusing out of the polyolefine particles due to the sudden decrease in the temperature in case the temperature of the water added is lower than the temperature of the polyolefine impregnated with the vinyl monomer.

The polymerization of the vinyl monomer which has absorbed into the polyolefine particles occurs by raising the temperature in the agitated reactor, whereby the initiator decomposes and initiates the polymerization. The polymerization can be performed at one or more temperatures within the temperature range from about 50° to about 140° C. The polymerization can preferable be started at a low temperature from about 50° to about 90° C. and thereafter completed at a high temperature from about 90° to about 140° C. The whole polymerization generally lasts for about 5-20 hours.

After the polymerization has been completed, the reactor is cooled and the product is then finished in a way normal in the suspension polymerization (e.g. washing and drying). The product is then ready for further treatment.

The polyolefine particles retain their particulate form during the polymerization. In comparison with the original polyolefine particles, the particles are after the polymerization only slightly larger depending on the absorbed and polymerized vinyl monomer.

The polymerization product provides a homogeneous impression and is aesthetically attractive. The vinyl polymer polymerized in the polyolefine particle is preferably distributed on pearls of a size from about 0.05 to about 2.0 $\mu$m, which are homogeneously distributed in the polyolefine matrix. The concentration of the vinyl monomer is as high in the middle as in the outer regions of the particle, determined from infrared microscopy.

Since the vinyl monomer is polymerized inside the polyolefine particle, part of the polymerized vinyl monomer is in the form of a homopolymer and part in a form grafted on the polyolefine. Even thought the share of the grafted vinyl polymer is considerably smaller than the share of the homopolymer, its existence is important for the morphological stability of the composite during processing.

A feature of this invention is that the morphology of the composite remains unchanged after treatment, i.e. that the vinyl polymer remains in the form of a pearl with a size of from about 0.05 to about 2.0 $\mu$m homogeneously distributed in the polyolefine matrix. The processing of the composite is simple depending on the wide temperature range for processing as well as on the suitable melt index at the processing temperature.

In comparison with unmodified polyolefines, the composites prepared according to this patent have improved mechanical properties, such as hardness, rigidity, and in certain cases strength.

Polymer composites prepared according to the present invention can be used in many different ways mainly depending on the type of polyolefine and vinyl monomer used as well as their mutual proportions.

Accordingly, it is e.g. possible to increase the mechanical strength on many polyolefines by polymerizing a vinyl monomer in situ inside the polyolefine. Also, e.g., the hardness and rigidity on the ethylene vinyl acetate copolymer and polypropene can be increased by polymerizing styrene into these in situ. These composites can be used as such and worked into various articles. The composites can also be blended with other thermoplastics, whereby the resultant composite has the above-mentioned advantages.

Ethylene vinyl acetate copolymer-polystyrene composites can be impregnated with some conventional volatile media, such as iso- or n-pentane, and thereafter expanded with water vapor into foam plastic. Such a foam plastic has better elastic properties and a better resistance to chemicals than polystyrene foam.

Polypropene-polystyrene composite films prepared according to this invention can be stretched in one or two directions and then used as synthetic paper.

Ethylene vinyl acetate copolymer-polystyrene composites can be one component in the semiconducting layer of electric cables, which are thereby easy to strip from the cable during coupling work.

DETAILED DESCRIPTION OF THE PREFERRED EMBODIMENTS

The following examples are given to further illustrate the present invention. The scope of the invention is not, however, meant to be limited to the specific details of the examples.

EXAMPLE 1

50 weight fractions (1000g) of ethylene vinyl acetate copolymer particles with a diameter of 3-4 mm were added into a 10-liter reactor. The ethylene vinyl acetate copolymer (EVA) was Neste Oy's commercial product EVACO B 5028 and contained 28% by weight vinyl acetate, and its melt index was 5 g/10 min, measured according to the standard ISO 1133, 2.16 kg and 190° C. Thereafter, 50 weight fractions of styrene and, as initiators, 0.15 weight fractions of azobis-isobutyl nitrile, 0.1 weight fractions of benzoyl peroxide and 0.075 weight fractions of t-butyl peroxybenzoate were added. The blend was agitated slowly, 2-20 revolutions per minute, at room temperature. After an impregnation of 10 minutes, water was added in small doses of 3.35 weight fractions at intervals of 2-4 minutes. Altogether 60 weight fractions of water was added during 50 minutes. The maximum torque of the agitator was 70 Ncm.

Next, the water suspension was prepared by further adding 290 weight fractions of water and, as stabilizing agents, 1.0 weight fractions of tricalcium phosphate and 0.03 weight fractions of sodium dodecyl benzene sulphonate. The agitation rate was then increased to 200 revolutions per minute.

The polymerization was started by raising the temperature to 55° C. and by keeping it there for three hours. The temperature was then raised to 90° C. during 8 hours. After one hour at 90° C., the temperature was raised to 120° C. during 1.5 hours and maintained there for 3 hours.

After cooling, the reactor was emptied and the 4-5 mm EVA-polystyrene composite particles were washed and dried. The particles were white and homogeneous. It could be observed by means of a scanning electron microscope that the polystyrene was dispersed as round pearls of about 0.1-0.5 μm in the EVA matrix.

COMPARATIVE EXAMPLE

A comparative experiment was performed according to the experiment 1 with the difference that no water was added during the impregnation phase. In this case, the maximum torque of the agitator was 120 Ncm.

EXAMPLE 2

50 weight fractions (300g) of EVACO B5028 with a diameter of 3-4 mm were added to a 3-liter reactor. Thereafter, 50 weight fractions of styrene and, as initiators, 1.5 weight fractions of di-cetyl peroxydicarbonate and 0.05 weight fractions of benzoyl peroxide were added. The blend was agitated slowly, 20-30 revolutions per minute, at 25° C. After an impregnation of 10 minutes, 8 weight fractions of water were added, and the impregnation was continued for 35 minutes.

The water suspension was then prepared by adding 280 weight fractions of water, 1 weight fraction of tricalcium phosphate, and 0.03 weight fractions of sodium dodecyl benzene sulphonate. The agitation rate was then raised to 240 revolutions per minute.

The polymerization was started by raising the temperature to 53° C. and therefrom to 65° C. during 2 hours. After one hour at this temperature, the temperature was raised to 90° C. during 2 hours and maintained there for 2 hours.

The polymerization product was finished in the same way as in Example 1, and it proved to have the same structure and appearance as in Example 1.

What is claimed is:

1. A method for preparing a polyolefine-vinyl polymer composite, comprising:
   A. impregnating from about 10 to about 200 weight fractions of vinyl monomer and from about 0.01 to about 4.0 weight fractions of a free radical polymerization initiator, based on 100 weight fractions of vinyl monomer, by slowly blending said vinyl monomer and said initiator in 100 weight fractions of polyolefine particles at a temperature from about 20° to about 100° C. initially in the absence of water, and adding from about 1 to about 60% by weight water, based on the total weight of the vinyl monomer and said polyolefine particles, immediately after said polyolefine particles begin absorption of said vinyl monomer, the total impregnation time being between about 0.2 and 1 hour, the amount of water added being sufficient to maintain the particulate structure of said polyolefine;
   B. preparing a water suspension by adding water and a stabilizing agent to the above-mentioned mixture after a substantially completed impregnation of said vinyl monomer into said polyolefine, whereby the total quantity of water added is from about 80 to about 1000 weight fractions, based on 100 weight fractions of polyolefine +vinyl monomer; and
   C. increasing the temperature of the water suspension to a level sufficient for polymerizing said vinyl monomer.

2. The method of claim 1, wherein said polyolefine comprises a polyethylene or an ethylene copolymer containing more than about 50% by weight ethylene.

3. The method of claim 2, wherein a commonomer of the copolymer is selected from the group consisting of vinyl acetate, an α-olefine, an acrylic, metacrylic acids or esters, polyenes, and vinyl chloride.

4. The method of claim 1, wherein said polyolefine comprises a polypropene or a propene copolymer containing more than about 50% by weight propene.

5. The method of claim 4, wherein a comonomer of the copolymer is selected from the group consisting of ethylene, an α-olefine, and another polar unsaturated monomer.

6. The method of claim 1, wherein the diameter of the polyolefine particles is from about 0.5 to about 10 mm.

7. The method of claim 1, wherein said vinyl monomer is aromatic.

8. The method of claim 7, wherein said vinyl monomer comprises styrene, a mixture of styrene and a substituted styrene selected from the group consisting of methyl styrene and α-methyl styrene.

9. The method of claim 7, wherein from about 1 to about 50% by weight of the amount of said aromatic vinyl monomer is replaced with a monomer selected from the group consisting of acrylonitrile, metacrylonitrile, $C_1$-$C_7$ alkyl acrylate, $C_1$-$C_7$ alkyl metacrylate, vinyl halides, maleic acid anhydride, acrylic-C amide, and metacrylic amide.

10. The method of claim 1, wherein said initiator is an organic free radical polymerization initiator selected from the group consisting of a peroxide and an azo compound selected from the group consisting of benzoyl peroxide, lauroyl peroxide, t-butyl peroxybenzoate, dicumyl peroxide, and azobis-isobutyronitrile.

11. The method of claim 1, wherein said polymerization of the vinyl monomer occurs at a temperature from about 50° to about 140° C.

12. The method of claim 1, wherein said vinyl monomer is dispersed as round pearls with a size of from about 0.05 to about 2.0 μm in the polyolefine matrix.

13. The method of claim 1, further comprising commencing with the addition of water during the impregnation step immediately when the polyolefine particles begin to absorb the vinyl monomer.

* * * * *